US012573872B2

(12) United States Patent
    Tang

(10) Patent No.: US 12,573,872 B2
(45) Date of Patent: Mar. 10, 2026

(54) CONTROL OF STATIC TRANSFER SWITCH SYSTEM FOR VOLT-SECOND BALANCE TRANSFER

(71) Applicant: L3Harris Technologies, Inc., Melbourne, FL (US)

(72) Inventor: Lixin Tang, Irvine, CA (US)

(73) Assignee: L3Harris Technologies, Inc., Melbourne, FL (US)

( * ) Notice: Subject to any disclaimer, the term of this patent is extended or adjusted under 35 U.S.C. 154(b) by 69 days.

(21) Appl. No.: 18/632,501

(22) Filed: Apr. 11, 2024

(65) Prior Publication Data

US 2025/0323521 A1    Oct. 16, 2025

(51) Int. Cl.
    H02J 9/06    (2006.01)
    H02H 3/26    (2006.01)

(52) U.S. Cl.
    CPC .............. H02J 9/061 (2013.01); H02H 3/26 (2013.01)

(58) Field of Classification Search
    CPC ................................... H02J 9/061; H02J 3/26
    USPC ........................................................ 307/64
    See application file for complete search history.

(56) References Cited

U.S. PATENT DOCUMENTS

| | | | |
|---|---|---|---|
| 7,495,804 B2 | 2/2009 | Rozzi | |
| 8,564,159 B2 | 10/2013 | Udagawa et al. | |
| 11,050,250 B2 | 6/2021 | Pfitzer et al. | |
| 2005/0184592 A1* | 8/2005 | Marwali | H02J 9/06 |
| | | | 307/52 |
| 2023/0187963 A1* | 6/2023 | Zhang | H02J 7/00712 |
| | | | 307/64 |

FOREIGN PATENT DOCUMENTS

| | | |
|---|---|---|
| EP | 2736147 B1 | 5/2014 |
| JP | 5092073 B1 | 12/2012 |
| JP | 5208593 B2 | 6/2013 |

* cited by examiner

*Primary Examiner* — Michael R. Fin
(74) *Attorney, Agent, or Firm* — Edell, Shapiro & Finnan, LLC

(57) ABSTRACT

A power system performs a method comprising: applying normal voltages to a load as load voltages; upon detecting a power fault that necessitates applying alternate voltages to the load in place of the normal voltages, disconnecting the normal voltages from the load; while waiting to detect a volt-second balance between the alternate voltages and the load voltages, determining one or more qualified voltages of the alternate voltages that will not saturate the load, and applying the one or more qualified voltages to the load as the load voltages; upon detecting the volt-second balance, additionally applying to the load each alternate voltage that is not the one or more qualified voltages; and after additionally applying, volt-second balancing the alternate voltages with the load voltages.

18 Claims, 13 Drawing Sheets

FIG.2

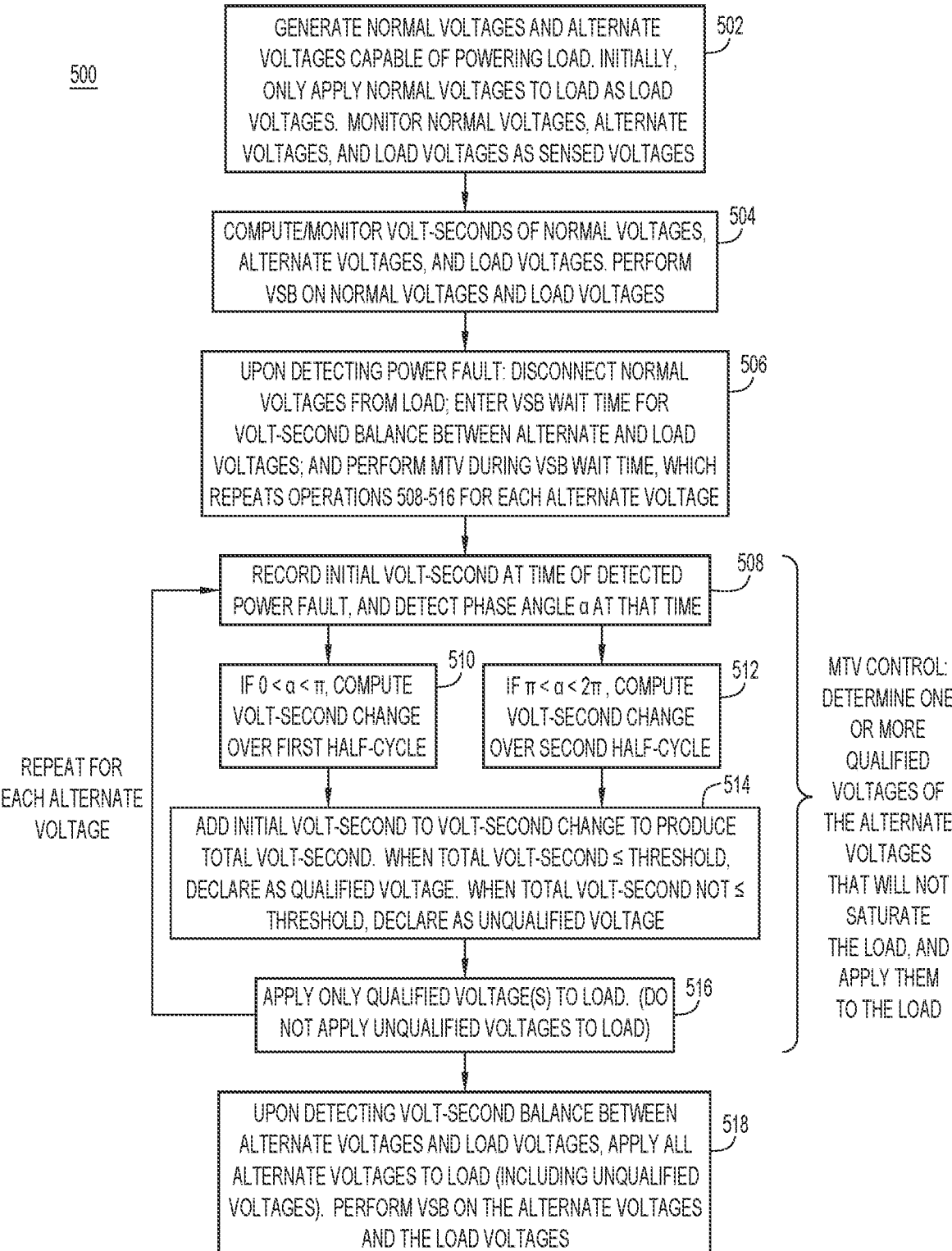

500

502

GENERATE NORMAL VOLTAGES AND ALTERNATE VOLTAGES CAPABLE OF POWERING LOAD. INITIALLY, ONLY APPLY NORMAL VOLTAGES TO LOAD AS LOAD VOLTAGES. MONITOR NORMAL VOLTAGES, ALTERNATE VOLTAGES, AND LOAD VOLTAGES AS SENSED VOLTAGES

504

COMPUTE/MONITOR VOLT-SECONDS OF NORMAL VOLTAGES, ALTERNATE VOLTAGES, AND LOAD VOLTAGES. PERFORM VSB ON NORMAL VOLTAGES AND LOAD VOLTAGES

506

UPON DETECTING POWER FAULT: DISCONNECT NORMAL VOLTAGES FROM LOAD; ENTER VSB WAIT TIME FOR VOLT-SECOND BALANCE BETWEEN ALTERNATE AND LOAD VOLTAGES; AND PERFORM MTV DURING VSB WAIT TIME, WHICH REPEATS OPERATIONS 508-516 FOR EACH ALTERNATE VOLTAGE

508

RECORD INITIAL VOLT-SECOND AT TIME OF DETECTED POWER FAULT, AND DETECT PHASE ANGLE α AT THAT TIME

510

IF 0 < α < π, COMPUTE VOLT-SECOND CHANGE OVER FIRST HALF-CYCLE

512

IF π < α < 2π, COMPUTE VOLT-SECOND CHANGE OVER SECOND HALF-CYCLE

514

ADD INITIAL VOLT-SECOND TO VOLT-SECOND CHANGE TO PRODUCE TOTAL VOLT-SECOND. WHEN TOTAL VOLT-SECOND ≤ THRESHOLD, DECLARE AS QUALIFIED VOLTAGE. WHEN TOTAL VOLT-SECOND NOT ≤ THRESHOLD, DECLARE AS UNQUALIFIED VOLTAGE

REPEAT FOR EACH ALTERNATE VOLTAGE

516

APPLY ONLY QUALIFIED VOLTAGE(S) TO LOAD. (DO NOT APPLY UNQUALIFIED VOLTAGES TO LOAD)

MTV CONTROL: DETERMINE ONE OR MORE QUALIFIED VOLTAGES OF THE ALTERNATE VOLTAGES THAT WILL NOT SATURATE THE LOAD, AND APPLY THEM TO THE LOAD

518

UPON DETECTING VOLT-SECOND BALANCE BETWEEN ALTERNATE VOLTAGES AND LOAD VOLTAGES, APPLY ALL ALTERNATE VOLTAGES TO LOAD (INCLUDING UNQUALIFIED VOLTAGES). PERFORM VSB ON THE ALTERNATE VOLTAGES AND THE LOAD VOLTAGES

FIG.5

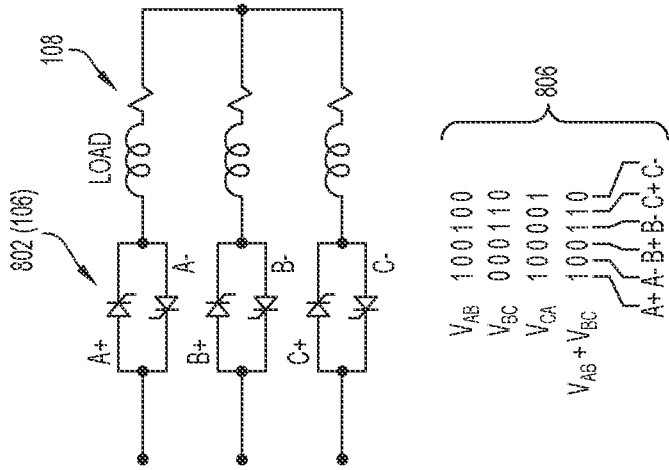
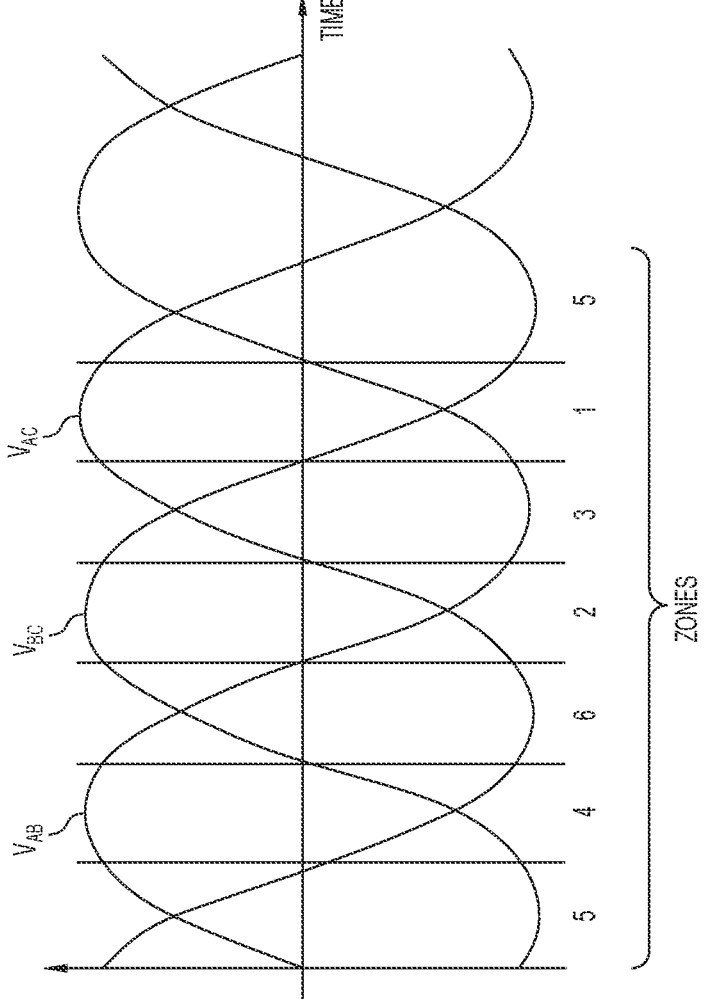
FIG.8

1500

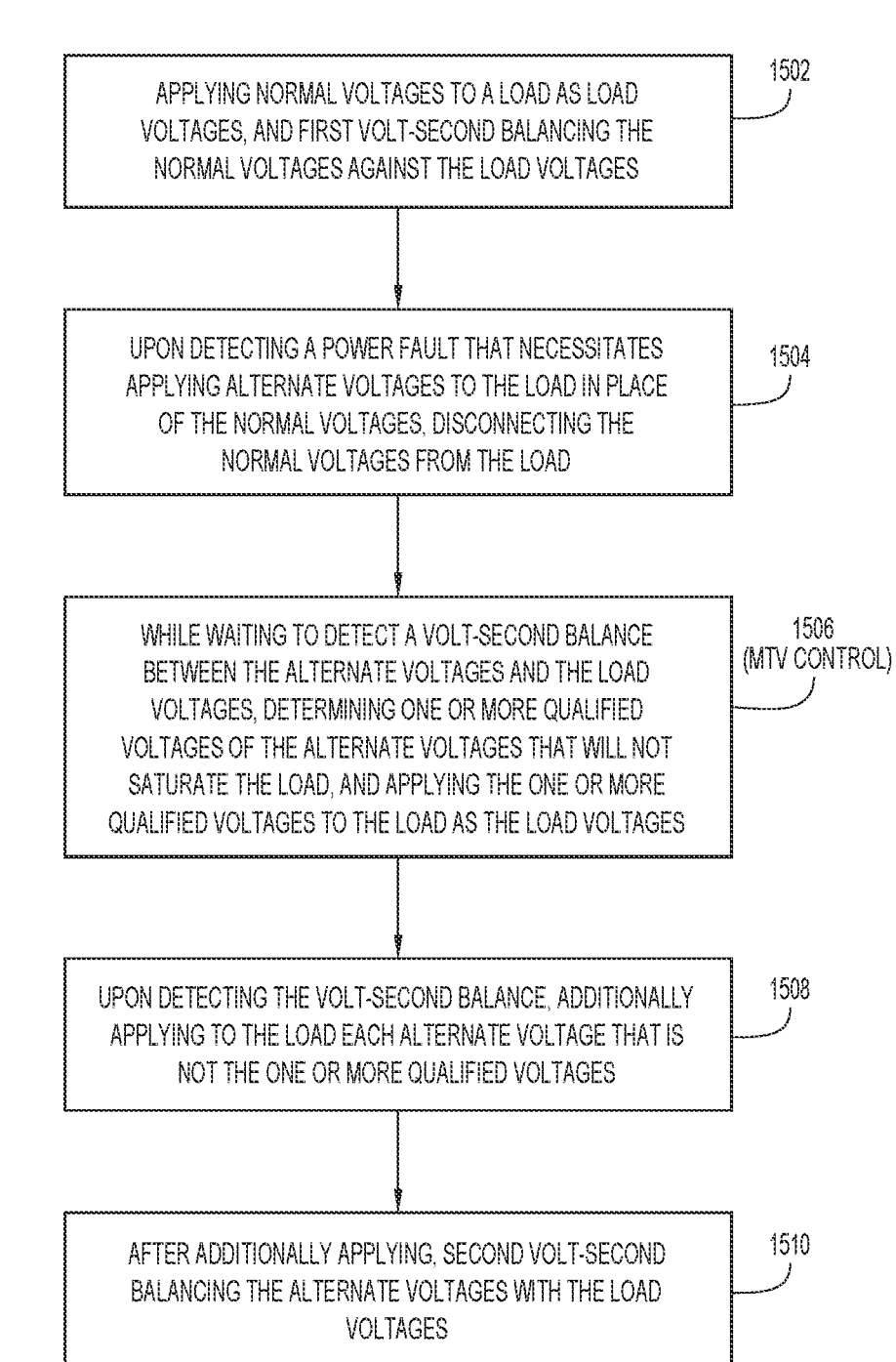

APPLYING NORMAL VOLTAGES TO A LOAD AS LOAD VOLTAGES, AND FIRST VOLT-SECOND BALANCING THE NORMAL VOLTAGES AGAINST THE LOAD VOLTAGES — 1502

UPON DETECTING A POWER FAULT THAT NECESSITATES APPLYING ALTERNATE VOLTAGES TO THE LOAD IN PLACE OF THE NORMAL VOLTAGES, DISCONNECTING THE NORMAL VOLTAGES FROM THE LOAD — 1504

WHILE WAITING TO DETECT A VOLT-SECOND BALANCE BETWEEN THE ALTERNATE VOLTAGES AND THE LOAD VOLTAGES, DETERMINING ONE OR MORE QUALIFIED VOLTAGES OF THE ALTERNATE VOLTAGES THAT WILL NOT SATURATE THE LOAD, AND APPLYING THE ONE OR MORE QUALIFIED VOLTAGES TO THE LOAD AS THE LOAD VOLTAGES — 1506 (MTV CONTROL)

UPON DETECTING THE VOLT-SECOND BALANCE, ADDITIONALLY APPLYING TO THE LOAD EACH ALTERNATE VOLTAGE THAT IS NOT THE ONE OR MORE QUALIFIED VOLTAGES — 1508

AFTER ADDITIONALLY APPLYING, SECOND VOLT-SECOND BALANCING THE ALTERNATE VOLTAGES WITH THE LOAD VOLTAGES — 1510

FIG.15

CONTROLLER
116

VG1, VG2, VGL

120

1665

EXTERNAL
INTERFACES

PROCESSOR    1660

1662

CONTROL
LOGIC

DATA

1666        MEMORY        1668

CONTROL OF STATIC TRANSFER SWITCH SYSTEM FOR VOLT-SECOND BALANCE TRANSFER

TECHNICAL FIELD

The present disclosure relates generally to controlling a static transfer switch system.

BACKGROUND

A static transfer switch (STS) system (also known as static automatic bus transfer (SABT) system) interfaces a normal power source which is capable of powering a load and an alternate power source which is also capable of powering the load. Initially, the STS system performs a "black start" to connect normal voltages from the normal power source to the load as load voltages. During the black start, the load voltages are zeros. When the normal power source fails and the alternate power source is in good condition, the STS system disconnects the normal voltages from the load, then performs volt-second balancing (VSB) control to connect alternate voltages from the alternate power source to the load in place of the disconnected normal voltages. The VSB transfer sequence (i.e., switchover) interrupts power from the load for a relatively long time period to avoid saturating a transformer associated with the load, which can trigger an undesired reset or shut-down of the load due to low transient alternating current (AC) voltages in three phases.

The STS system includes a large number of components to support the VSB, which drives up cost and complexity. For example, the STS system includes a first set of voltage sensors and integrators to sense and integrate the normal voltages into a first set of volt-second signals, a second set of voltages sensors and integrators to integrate the alternate voltages into a second set of volt-second signals, and a third set of voltage sensors and integrators to integrate the load voltages into a third set of volt-second signals. Each voltage sensor includes an analog-to-digital converter (ADC) followed by hardware and/or software filters. Each integrator includes firmware and/or software to implement a calculation block, and possibly a direct current (DC) detection and removal block.

BRIEF DESCRIPTION OF THE DRAWINGS

FIG. 5 is a flowchart of an example method of performing a VSB transfer with maximum transient voltage (MTV) control.

FIG. 8 shows an example of controlling switches in a power switch of the power system.

FIG. 15 is a flowchart of another example method of performing a VSB transfer with MTV control.

DESCRIPTION

Overview

An embodiments includes a power system that performs a method comprising: applying normal voltages to a load as load voltages; upon detecting a power fault that necessitates applying alternate voltages to the load in place of the normal voltages, disconnecting the normal voltages from the load; while waiting to detect a volt-second balance between the alternate voltages and the load voltages, determining one or more qualified voltages of the alternate voltages that will not saturate the load, and applying the one or more qualified voltages to the load as the load voltages; upon detecting the volt-second balance, additionally applying to the load each alternate voltage that is not the one or more qualified voltages; and after additionally applying, volt-second balancing the alternate voltages with the load voltages.

EXAMPLE EMBODIMENTS

Figure 1:
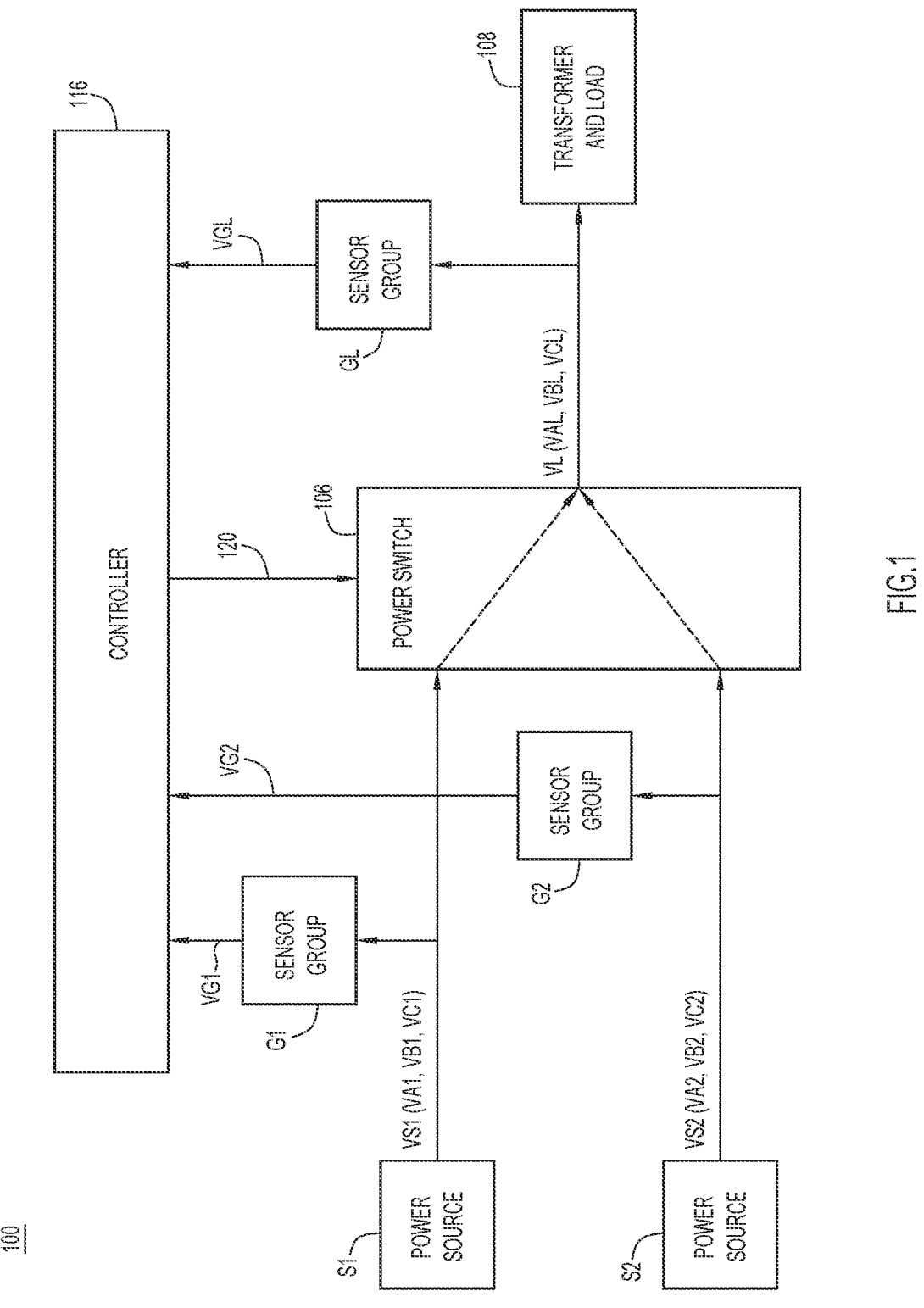
FIG. 1 is a high-level block diagram of an example power system in which fault-tolerant STS operation may be implemented.

FIG. 1 is a high-level block diagram of an example power system 100 (also referred to as an "apparatus") in which embodiments presented herein may be implemented. The embodiments include (i) maximum transient voltage (MTV) control to reduce a transfer time and voltage interruption of conventional VSB, and (ii) simplified VSB (SVSB) to reduce conventional hardware and firmware/software requirements by almost a third, while maintaining the same performance as the conventional VSB. Power system 100 includes a power source S1 (also referred to as "normal" power source), a power source S2 (also referred to as an "alternate" power source), a power switch 106, a transformer and load 108, sensor groups G1, G2, and GL, and a controller 116 to control the power system. The transformer and load 108 is shown as an example. Embodiments presented herein may be applied to other types of loads.

Power source S1 generates alternating current (AC) three-phase (3Φ) voltages VS1 (also referred to as "normal voltages" and "S1 voltages") including VA1, VB1, and VC1 and provides the same to a first 3Φ input of power switch 106. Power source S2 generates AC 3Φ voltages VS2 (also referred to as "alternate voltages" and "S2 voltages") including VA2, VB2, and VC2 and provides the same to a second 3Φ input of power switch 106 in parallel with the S1 voltages. Power switch 106 selects either the S1 voltages or the S2 voltages as selected voltages for powering transformer and load 108, responsive to a switch control signal 120 generated by controller 116. Power switch 106 passes the selected voltages (from a 3Φ output of the power switch) to transformer and load 108 as 3Φ load voltages VL including VAL, VBL, and VCL, which power the transformer and load. Voltage sensor groups G1, G2, and GL sense/measure the S1 voltages, the S2 voltages, and the load voltages to produce sensed S1 voltages VG1, sensed S2 voltages VG2, and sensed load voltages VGL, respectively, and provide the sensed voltages to controller 116. In the example, the sensed voltages are also 3Φ voltages. Controller 116 generates switch control signal 120 and implements embodiments presented herein based on the sensed voltages.

Power system 100 may operate as an STS system, for example, in which controller 116 commands/controls power switch 106 to connect either power source S1 or power source S2 (i.e., a selected power source) to transformer and load 108, so that either the S1 voltages or the S2 voltages become selected voltages that power the transformer and load. In STS operation, controller 116 monitors the currents associated with the S1 voltages, the S2 voltages, and monitors the load current and voltage supplied to transformer and load 108 by the (currently) selected power source. Any know or hereafter developed current sensors and current sensing techniques for monitoring the currents may be used. Responsive to detecting a selected power source fault based on the monitoring, controller 116 rapidly commands power switch 106 to select the "other" power source (e.g., to switch from power source S1 to power source S2, or vice versa) as an alternate power source to ensure that voltage/power provided to transformer and load 108 is maintained.

Efficient STS operation relies on close monitoring of the S1 voltages, the S2 voltages, and the load voltages using sensor groups G1, G2, and GL. For example, STS operation employs volt*second balancing (VSB) control to reduce transient saturation of transformer windings of transformer and load 108. Efficient VSB control relies on fast and accurate monitoring/comparing of the load voltages, the S1 voltages, S2 voltages, and the load voltages to achieve a balanced/optimal VSB transfer sequence between the power sources. To reduce the relatively long voltage interruption caused by a conventional VSB transfer sequence, embodiments presented herein employ a modified VSB transfer sequence that includes a maximum voltage transient (MTV) control (also referred to as "VSB transfer with MTV control").

At a high-level, the VSB transfer with MTV control operates as follows. When power system 100 detects a power failure that necessitates a switchover from initial voltages (e.g., the S1 voltages) to alternate voltage (e.g., the S2 voltages), the power system disconnects the initial voltages and waits a VSB wait time for the alternate voltages to achieve volt-second balance with the load voltages. While waiting, power system 100 executes the MTV control. The MTV control determines one or more "qualified" voltages of the alternate voltages that will not saturate transformer and load 108, and (during the VSB wait time, before the volt-second balance is detected) switches only the qualified voltages to the transformer and load. Eventually, upon detecting the volt-second balance between the alternate voltages and the load voltages, power system 100 connects the remaining (all) of the alternate voltages to transformer and load 108, and performs VSB between those voltages. In this way, the MTV control increases a transient voltage (and corresponding transient power) applied to transformer and load 108, during the VSB wait time, which effectively decreases the VSB wait time. An advantage of the MTV control is that transformer and load 108 experiences less transient voltage interruption compared to conventional VSB transfer without the MTV control.

Figure 2:
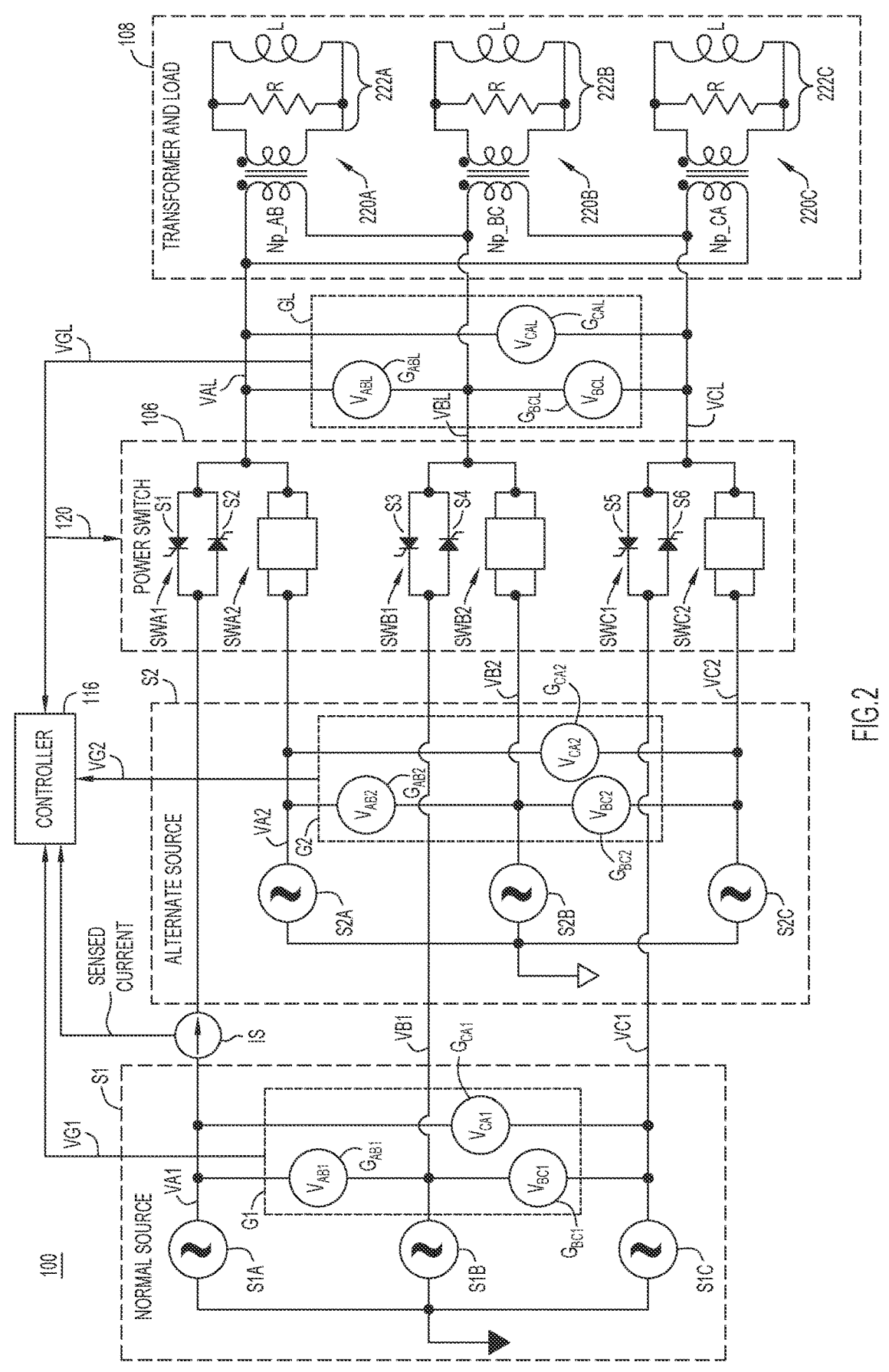
FIG. 2 is a circuit diagram of the power system, according to an embodiment.

FIG. 2 is a circuit diagram of power system 100 expanding on the circuit blocks depicted in FIG. 1, according to an embodiment. Power source S1 includes power sources SIA, S1B, and S1C to generate voltages VA1, VB1, and VC1 (e.g., voltages VS1 from FIG. 1), respectively, and provide the same to power switch 106 over respective voltage lines. Power source S2 includes power sources S2A, S2B, and S2C to generate voltages VA2, VB2, and VC2 (e.g., voltages VS2 from FIG. 1), and provide the same to power switch 106 over respective voltage lines. In one arrangement, power sources S1 and S2 are electrically isolated from each other. FIG. 2 depicts such isolation with different shadings of the neutral connections (which FIG. 2 depicts as inverted triangles) for the two power sources. Specifically, the neutral connection for power source S1 is shaded, while the neutral connection for power source S2 is not shaded. In another arrangement, power sources S1 and S2 are not electrically isolated from each other.

Power switch 106 includes a first set of three parallel switches SWA1 including sub-switch pair (S1, S2), SWB1 including sub-switch pair (S3, S4), and SWC1 including sub-switch pair (S5, S6) having respective inputs to receive voltages VA1, VB1, and VC1 over respective input voltage and respective outputs connected to transformer and load 108 over respective output voltage lines. Each sub-switch pair includes two silicon controlled rectifiers (SCRs) (also referred to as thyristors) connected to each other in oppositely biased directions, between the input and the output of the sub-switch pair, as shown.

Power switch 106 includes a second set of three parallel switches SWA2, SWB2, and SWC2 having respective inputs to receive voltages VA2, VB2, and VC2 and respective outputs connected to transformer and load 108 over respective voltage lines. Switches SWA2, SWB2, and SWC2 respectively include sub-switch pairs (not shown in FIG. 2) configured, and that operate, similarly to the sub-switch pairs of switches SWA1, SWB1, and SWC1, as described above and below.

Power system 100 may include current sensors connected in-line with respective ones of the above-mentioned voltage lines to sense currents flowing through the voltage lines, to produce sensed currents (i.e., current measurements). The current sensors provide their sensed currents to controller 116. To avoid clutter, FIG. 2 shows only one such current sensor, i.e., current sensor IS connected in-line with the voltage line for voltage VA1. It is understood that similar current sensors may be connected in-line with the other voltage lines leading from power sources S1, S2 to power switch 106, and from the power switch to transformer and load 108.

FIG. 2 shows a particular configuration for power switch 106 by way of example, only. It is understood that any known or hereafter developed AC power switch may be used to selectively connect either power source S1 or power source S2 to transformer and load 108 at any given time under control of controller 116.

As generated by controller 116, switch control signal 120 (also referred to as an "SCR gate control") commands/controls power switch 106 such that either:

a. Switches SWA1, SWB1, and SWC1 connect/pass/supply voltages VA1, VB1, and VC1 generated by power sources SIA, S1B, and SIC of power source S1 to transformer and load 108 as load voltages VAL, VBL, and VCL (e.g., load voltages VL from FIG. 1); or b. Switches SWA2, SWB2, and SWC2 connect/pass/supply voltages VA2, VB2, and VC2 generated by power sources S2A, S2B, and S2C of power source S2 to transformer and load 108 as load voltages VAL, VBL, and VCL.

In this way, power switch 106 is responsible for supplying or not supplying voltages VS1 to transformer and load 108, and for supplying or not supplying voltages VS2 to the transformer and load under control of controller 116.

Sensor group G1 includes three voltages sensors $G_{AB1}$, $G_{BC1}$, and $G_{CA1}$ connected to and between (i.e., across) respective pairs of power sources SIA, S1B, and S2C to sense line-to-line voltages (i.e., relative voltages) $V_{AB1}$ between voltage pair (VA1, VB1), $V_{BC1}$ between voltage pair (VB1, VC1), and $V_{CA1}$ between voltage pair (VA1, VC1). Sensor group G1 provides sensed voltages $V_{AB1}$, $V_{BC1}$, and $V_{CA1}$ to controller 116 as sensed voltages VG1.

Sensor group G2 includes three voltages sensors $G_{AB2}$, $G_{BC2}$, and $G_{CA2}$ connected to and between respective pairs of power sources S2A, S2B, and S2C to sense line-to-line voltages (i.e., relative voltages) $V_{AB2}$ between voltage pair (VA2, VB2), $V_{BC2}$ between voltage pair (VB2, VC2), and $V_{CA2}$ between voltage pair (VA2, VC2). Sensor group G2 provides sensed voltages $V_{AB2}$, $V_{BC2}$, and $V_{CA2}$ to controller 116 as sensed voltages VG2.

Sensor group GL includes three voltages sensors $G_{ABL}$, $G_{BCL}$, and $G_{CAL}$ connected to and between (i.e., across) respective pairs of voltage lines that carry load voltages VAL, VBL, and VCL to sense line-to-line voltages (i.e., relative voltages) $V_{ABL}$ between voltage pair (VAL, VBL), $V_{BCL}$ between voltage pair (VBL, VCL), and $V_{CAL}$ between voltage pair (VAL, VCL). Sensor Group GL provides relative sensed voltages $V_{ABL}$, $V_{BCL}$, and $V_{CAL}$ to controller 116 as sensed voltages VGL.

Controller 116 receives sensed voltages VG1, VG2, and VGL (and sensed currents) and generates switch control signal 120 based on the sensed voltages and other parameters/conditions described below. Switch control signals 120 may include multiple signals, including one signal for each pair of sub-switches of power switch 106, for example.

Transformer and load 108 includes transformer-load sections 220A, 220B, and 220C associated with respective limbs of a three-limb transformer arranged in a delta configuration, for example. Transformer-load section 220A includes primary-side winding Np_AB to receive load voltage VAL, an opposing secondary-side winding, and a resistive and inductive load (RL) 222A coupled to the secondary-side winding. Transformer-load section 220B includes primary-side winding Np_BC to receive load voltage VBL, an opposing secondary-side winding, and an RL load 222B coupled to the secondary-side winding. Transformer-load section 220C includes primary-side winding Np_CA to receive load voltage VCL, an opposing secondary-side winding, and an RL load 222C coupled to the secondary-side winding. In the above-described arrangement, switches (SWA1 or SWA2), (SWB1 or SWB2), and (SWC1 or SWC2) respectively supply load voltages VAL, VBL, and VCL to transformer-load sections 220A, 220B, and 220C under control of switch control signal 120 generated by controller 116.

In summary, power system 100 includes three sensor groups G1, G2, and GL for power source S1 (e.g., the normal power source), power source S2 (e.g., the alternate power source), and transformer and load 108 voltage sensing. Each sensor group includes three voltage sensors to measure/sense relative voltages between power voltage pairs ($\Phi$A, $\Phi$B), ($\Phi$B, $\Phi$C), and ($\Phi$A, $\Phi$C).

Figure 3:
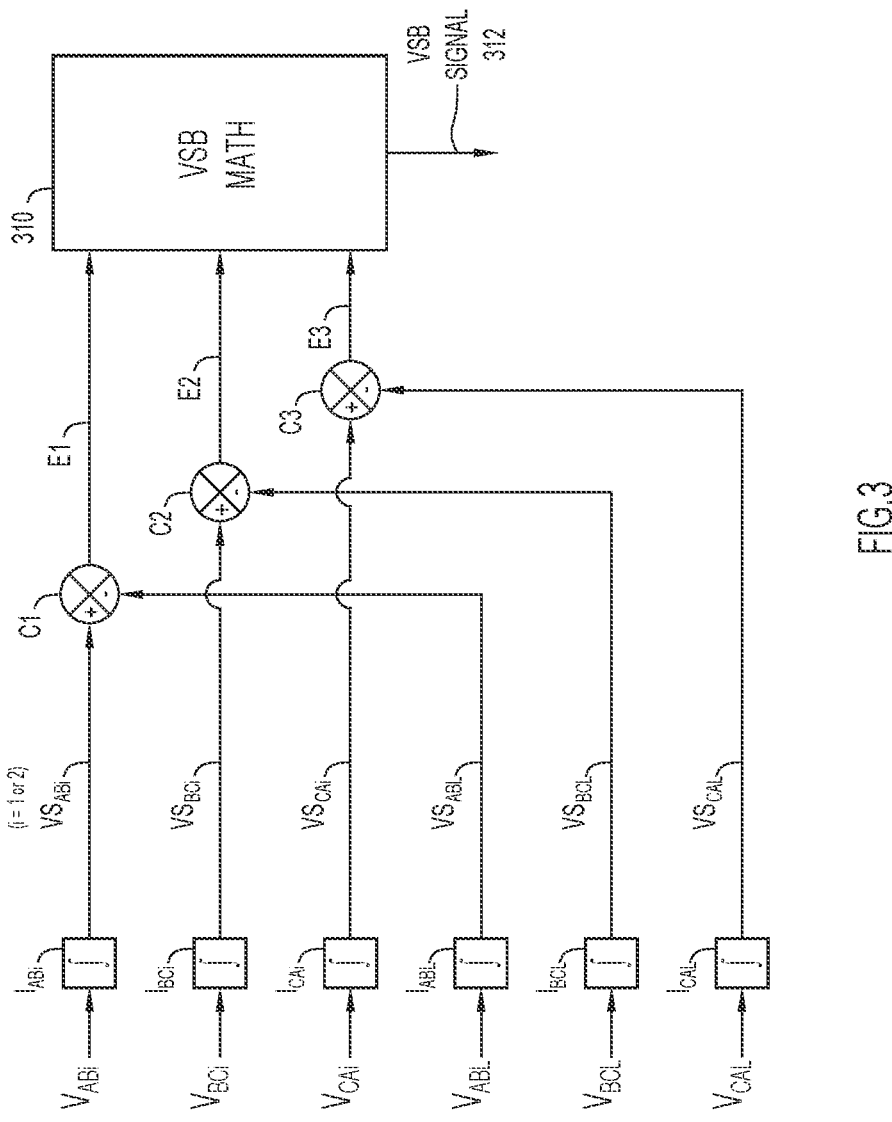
FIG. 3 is a block diagram of an example VSB architecture of the power system used to perform VSB.

FIG. 3 is a block diagram of an example VSB architecture 300 of power system 100 used to perform VSB. VSB architecture 300 may be implemented in controller 116, for example. VSB architecture 300 includes three integrators $I_{ABi}$, $I_{BCi}$, and $I_{CAi}$ (where i=1, 2) to integrate sensed voltages $V_{ABi}$, $V_{BCi}$, and $V_{CAi}$ over time to produce volt-seconds $VS_{ABi}$, $VS_{BCi}$, and $VS_{CAi}$, and to provide the same to first inputs of three comparators C1, C2, and C3, respectively. VSB architecture 300 also includes three integrators $I_{ABL}$, $I_{BCL}$, and $I_{CAL}$ to integrate sensed voltages $V_{ABL}$, $V_{BCL}$, and $V_{CAL}$ over time to produce volt-seconds $VS_{ABL}$, $VS_{BCL}$, and $VS_{CAL}$, and provide the same to second inputs of comparators C1, C2, and C3, respectively. Comparators C1, C2, and C3 respectively compare the volt-seconds received at the first and second inputs of the comparators, to produce volt-second differences or errors E1, E2, and E3, respectively, and to provide the same to VSB math module 310. VSB math module 310 determines whether differences between errors E1, E2, and E3 are less than a preset value or not less than the preset value.

When the differences between errors E1, E2, and E3 are less than the preset value, the volt-seconds ($VS_{ABi}$, $VS_{BCi}$, and $VS_{CAi}$) and ($VS_{ABL}$, $VS_{BCL}$, and $VS_{CAL}$) are considered balanced (i.e., in a balanced condition). That is, the volt-seconds of sensed voltages $V_{ABi}$, $V_{BCi}$, and $V_{CAi}$ are balanced with the volt-seconds of sensed load voltages $V_{ABL}$, $V_{BCL}$, and $V_{CAL}$. On the other hand, when the absolute errors E1, E2, and E3 are not less than the preset value, the volt-seconds ($VS_{ABi}$, $VS_{BCi}$, and $VS_{CAi}$) and ($VS_{ABL}$, $VS_{BCL}$, and $VS_{CAL}$) are considered unbalanced (i.e., not in the balanced condition). That is, the volt-seconds of sensed voltages $V_{ABi}$, $V_{BCi}$, and $V_{CAi}$ are not balanced with the volt-seconds of sensed load voltages $V_{ABL}$, $V_{BCL}$, and $V_{CAL}$.

VSB math module 310 generates a VSB signal 312 to indicate that either the balanced or unbalanced volt-second condition exists at any given time. For example, VSB signal 312 may have a first state to indicate volt-second balance, and a second state to indicate volt-second unbalance (i.e., imbalance). Controller 116 may take different actions depending on the state of VSB signal 312. For example, when VSB signal 312 indicates a volt-second imbalance, controller 116 may wait until a balanced switching point is available to control parameters of voltages VS1 or VS2 (e.g., assert control over power source S1 or S2) to achieve the volt-second balance.

VSB architecture 300 may be simplified based on the following analysis. According to Kirchhoff's Voltage Law (KVL) in a delta-connected system:

$$V_{ABX} + V_{BCX} + V_{CAX} = 0 \qquad \text{Eq. (1)}$$

where X can be 1, 2 or L, indicating voltage sensor groups for S1, S2 and load, and the three voltages coincide in time, e.g., they should be sampled at the same time.

The volt-seconds of $V_{AB}$, $V_{BC}$ and $V_{CA}$ can be calculated as follows:

$$\int (V_{ABX} + V_{BCX} + V_{CAX})dt = 0 \qquad \text{Eq. (2)}$$

$$VS_{ABX} + VS_{BCX} + VS_{CAX} = 0 \qquad \text{Eq. (3)}$$

$$VS_{CAX} = -VS_{ABX} - VS_{BCX} \qquad \text{Eq. (4)}$$

From Eq. 4, it is evident that only two volt-second calculations are needed for VSB control, because the third can be derived/constructed from the other two. Thus, Eq. (4) forms the basis of a simplified resource-efficient VSB (SVSB) control, described below in connection with FIG. 4.

Figure 4:
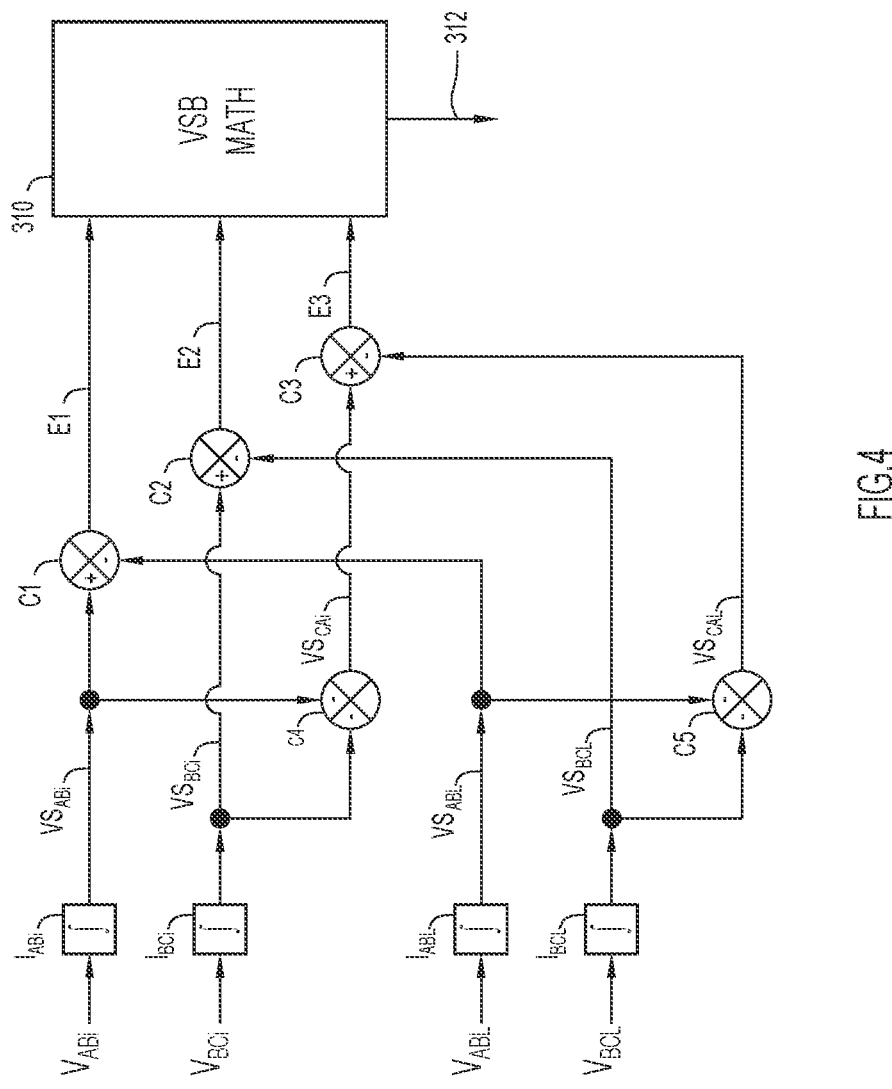
FIG. 4 is a block diagram of an example simplified VSB (SVSB) architecture used to perform SVSB control.

FIG. 4 is a block diagram of an example SVSB architecture 400 of power system 100 used to perform SVSB control. SVSB architecture 400 may be implemented in controller 116, for example. SVSB architecture 400 includes only two integrators $I_{ABi}$ and $I_{BCi}$ to provide volt-seconds $VS_{ABi}$ and $VS_{BCi}$ to the first inputs of comparators C1 and C2 (as described above), and also to first and second inverting inputs of an adder C4, as shown. Adder C4 implements Eq. (4) above to produce volt-second $VS_{CAi}$ from the other two volt-seconds. Adder C4 provides volt-second $VS_{CAi}$ to the first input of comparator C3.

Similarly, SVSB architecture 400 includes only two integrators $I_{ABL}$ and $I_{BCL}$, which provide volt-seconds $VS_{ABL}$ and $VS_{BCL}$ to the second inputs of comparators C1 and C2 (as described above), and also to first and second inverting inputs of an adder C5, as shown. Adder C5 implements Eq. (4) to produce volt-second $VS_{CAL}$ from the other two volt-seconds. Adder C5 provides volt-second $VS_{CAL}$ to the second input of comparator C3.

In summary, SVSB architecture 400 performs the following efficient operations:

a. Integrating a first voltage (e.g., $V_{ABi}$) to produce a first volt-second (e.g., $VS_{ABi}$) and integrating a second voltage (e.g., $V_{BCi}$) to produce a second volt-second (e.g., $V_{BCi}$).

b. Deriving a third volt-second (e.g., $VS_{CAi}$) for a third voltage (e.g., $V_{CAi}$) based on the first volt-second and the second volt-second. This includes negating each of the first and second volt-seconds, and summing their negated versions, to produce the third volt-second.

c. Repeating (a) and (b) for the two load voltages, to produce first, second, and third load voltage volt-seconds.

d. Performing volt-second balancing of the first voltage, the second voltage and the third voltage against the load voltages using the first volt-second, the second volt-second, and the third volt-second, and the volt-seconds of the load voltages.

SVSB reduces hardware and software resources and complexity used to perform VSB by 33% compared to the VSB architecture of FIG. 3, while maintaining the same performance.

FIG. 5 is a flowchart of an example method 500 of performing a VSB transfer with MTV control. In the ensuing description, normal power source S1, alternate power source S2, normal voltages VS1, and alternate voltages VS2 may be referred to as simply power source S1, power source S2, voltages VS1, and voltages VS2, respectively.

At 502, power sources S1, S2 respectively generate voltages VS1, VS2 capable of powering transformer and load 108. Initially, controller 116 controls power switch 106 to apply/switch only voltages VS1 to transformer and load 108 as load voltages VL. Sensor groups G1, G3, and GL provided respective sensed voltages VG1, VG2, and VGL representative of voltages VS1, VS2, and VGL to the controller.

At 504, controller 116 computes and monitors the volt-seconds of voltages VS1 (e.g., volt-seconds $VS_{AB1}$, $VS_{BC1}$, and $VS_{CA1}$), VS2 (e.g., volt-seconds $VS_{AB2}$, $VS_{BC2}$, and $VS_{CA2}$), and VL (e.g., volt-seconds $VS_{ABL}$, $VS_{BCL}$, and $VS_{CAL}$), and performs a black start to minimize the inrush current to the transformer. Controller 504 also monitors power sources S1, S2 for power faults.

At 506, controller 116 detects/senses a power fault of power source S1 that necessitates a switchover from power source S1 to power source S2 to provide power to transformer and load 108. An example power fault may include, but is not limited to, sensing a zero or near zero load current, an absence of one or more of voltages VL, and so on. Upon detecting the power fault, controller 116 starts a VSB transfer from voltages VS1 to voltages VS2. Controller 116 commands power switch 106 to disconnect voltages VS1 from transformer and load 108.

Before commanding power switch 106 to apply/connect (all) voltages VS2 to transformer and load 108 and begin normal VSB using voltages VS2, controller 116 waits a blanking interval for all of the SCRs of power switch 106 to turn OFF, and waits a VSB wait time for voltages VS2 and VL to achieve volt-second balance (i.e., to become volt-second balanced). A disadvantage of waiting the VSB wait time before applying voltages VS2 is that transformer and load 108 experiences a relatively long interruption in power. To avoid this situation, the MTV control is employed to increase a maximum transient voltage (and corresponding maximum transient power) applied to transformer and load 108, during the VSB wait time, which effectively decreases the VSB wait time.

Detection of the power fault triggers the MTV control, which executes during the VSB wait time to "fill-in" otherwise missing voltages without saturating transformer and load 108. While the MTV control executes, controller 116 continues to monitor the volt-seconds for voltages VS2 and VL to detect (eventually) the volt-second balance condition (e.g., indicated by VSB signal 312, for example), which signals an end to the MTV control. At a high level, the MTV control (i) determines one or more qualified voltages of voltages VS2 that will not saturate transformer and load 108 when switched/applied to the transformer and load during the VSB wait time, based on sub-cycle changes to the volt-seconds of the voltages VS2 (i.e., the "alternate voltages") that occur during the VSB wait period, after the fault is detected, and (ii) applies only the one or more qualified voltages (not any unqualified voltages of the voltages VS2) to the transformer and load. The MTV control includes operations 508-516, described below. The MTV control repeats operations 508-516 for each of voltages VS2 (i.e., for each alternate voltage). The VS2 voltages under consideration in each iteration may be referred to simply as "the voltage."

Upon detecting the power fault, or shortly thereafter, at 508, controller 116 records an initial volt-second $VS_{X0}$ of the voltage (where X=AB2, BC2, or CA2), and detects a phase angle $\alpha$ of the voltage at that time. The voltage is cyclical, having (i) a first half-cycle from 0 to $\pi$ (i.e., 180 degrees (180°)), and (ii) a second half-cycle from $\pi$ to $2\pi$ (i.e., 360°). When detected, phase angle $\alpha$ may fall anywhere in the first or second half-cycle. To detect phase angle $\alpha$, controller 116 detects a zero-crossing time of a zero-crossing of the voltage, a power fault time when the power fault is detected, measures a time offset between the two times, and translates the time offset to phase angle $\alpha$ based on a known time period of the voltage. Any other known technique for detecting the phase angle may be used.

Upon detecting a first condition (i.e., condition 1) when a falls in the first half-cycle (i.e., when $0<\alpha<\pi$), at 510, controller 116 computes a volt-second change $\Delta VS_{X0}$ of the voltage that occurs over a remainder of the first half-cycle of the voltage, beginning with a. This includes integrating the voltage over time/phase angle from a to x. Volt-second change $\Delta VS_{X0}$ represents the change of $VS_{X0}$ over the first half-cycle of the voltage that remains after starting phase angle $\alpha$. Mathematically:

$$\Delta VS_X = \int_\alpha^\pi V_{Max}\sin(\omega t)d(\omega t) = \frac{V_{Max}}{\omega}(1 + \cos(\alpha)).$$

Upon detecting a second condition (i.e., condition 2) when a falls in the second half-cycle (i.e., when $\pi<\alpha>2\pi$), at 512, controller 116 computes volt-second change $\Delta VS_{X0}$ of the voltage that occurs over a remainder of the second half-cycle of the voltage, beginning with $\alpha$. This includes integrating the voltage over time/phase angle from $\alpha$ to $2\pi$. Mathematically:

$$\Delta VS_X = \int_\alpha^{2\pi} V_{Max}\sin(\omega t)\,d(\omega t) = \frac{V_{Max}}{\omega}(\cos(\alpha) - 1).$$

At 514, controller 116 adds volt-second change $\Delta VS_{X0}$ to initial volt-second $VS_{X0}$ (i.e., sums the two values) to produce a total volt-second during the VSB wait time, and determines whether a magnitude of the total volt-second≤a volt-second threshold $VS_{LIM}$, which represents a volt-second saturation limit for transformer and load 108, for example. When the total volt-second≤volt-second threshold $VS_{LIM}$, the voltage is a declared a qualified voltage that can be applied to transformer and load 108 during the VSB wait time, and before voltages VS2 and VL have achieved their volt-second balance. On the other hand, when the total volt-second>volt-second threshold $VS_{LM}$, the voltage is declared an unqualified voltage (i.e., not a qualified voltage) that cannot be applied to transformer and load 108 during the VSB wait time because the voltage, if applied, may cause saturation. The test represents a voltage selection rule, expressed mathematically as:

If $|\Delta VS_{X0}$ to $VS_{X0}|\le VS_{LIM}$, then apply voltage Vx to the transformer and load 108.

The above-described operations may classify one or more of voltages VS2 as qualified voltages that can be applied and one or more of voltages VS2 as unqualified voltages that cannot be applied.

At 516, controller 116 commands power switch 106 to apply all the qualified voltages (but not the unqualified voltages) to transformer and load 108 during the VSB wait time.

Next, at 518, controller 116 detects that voltages VS2 and VL have become volt-second balanced (e.g., as indicated by VSB signal 312), signaling an end to the VSB wait time. Upon detecting the volt-second balanced condition, controller 116 commands power switch 106 to apply to transformer and load 108 the remaining (unqualified) voltages of voltages VS2 in addition to the qualified voltage(s) (i.e., to apply all of the voltages VS2). After the switchover, controller 116 performs VSB on the voltages VS2 and VL based on their volt-seconds.

Figure 6:
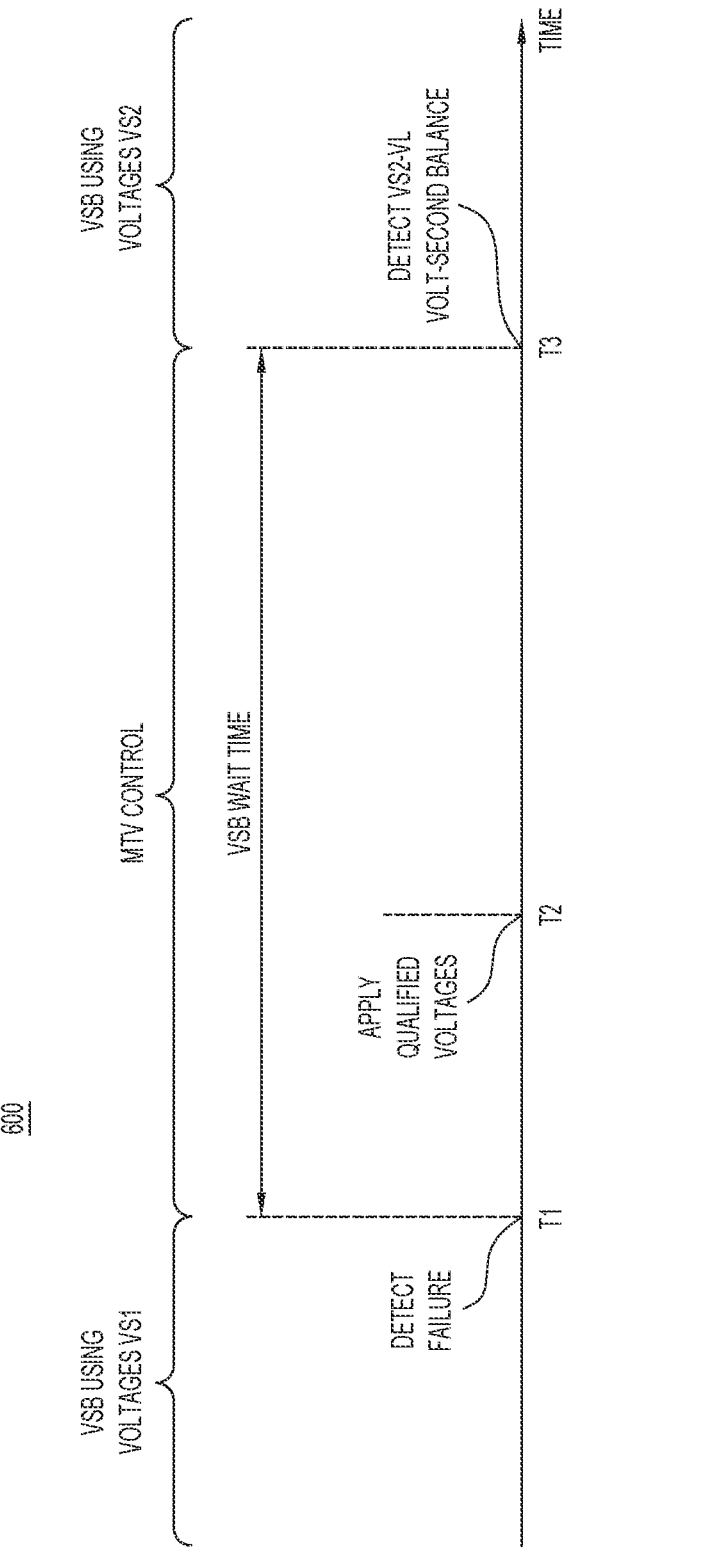
FIG. 6 shows an example event timeline for the method of FIG. 5.

FIG. 6 shows an example event timeline 600 for method 500. Initially, power switch 106 applies voltages VS1 to transformer and load 108, and controller 116 performs VSB between voltages VS1 and voltages VL. At time T1, controller 116 detects a power failure necessitating switchover to voltages VS2. Upon detecting the failure, controller 116 commands power switch 106 to disconnect voltages VS1 from transformer and load 108, waits a VSB wait time for voltages VS2 and VL to become volt-second balanced (while monitoring the volt-seconds of the sensed voltages for voltages VS2 and VL for the balanced condition), and executes the MTV control during the VSB wait time. At time T2 during the VSB wait time, MTV control applies one or more qualified voltages to transformer and load 108. At time T3, controller 116 detects volt-second balance between voltages VS2 and VL, exits the MTV control, controls power switch 106 to apply all of voltages VS2 to transformer and load 108, and enters VSB between voltages VS2 and VL.

Figure 7:
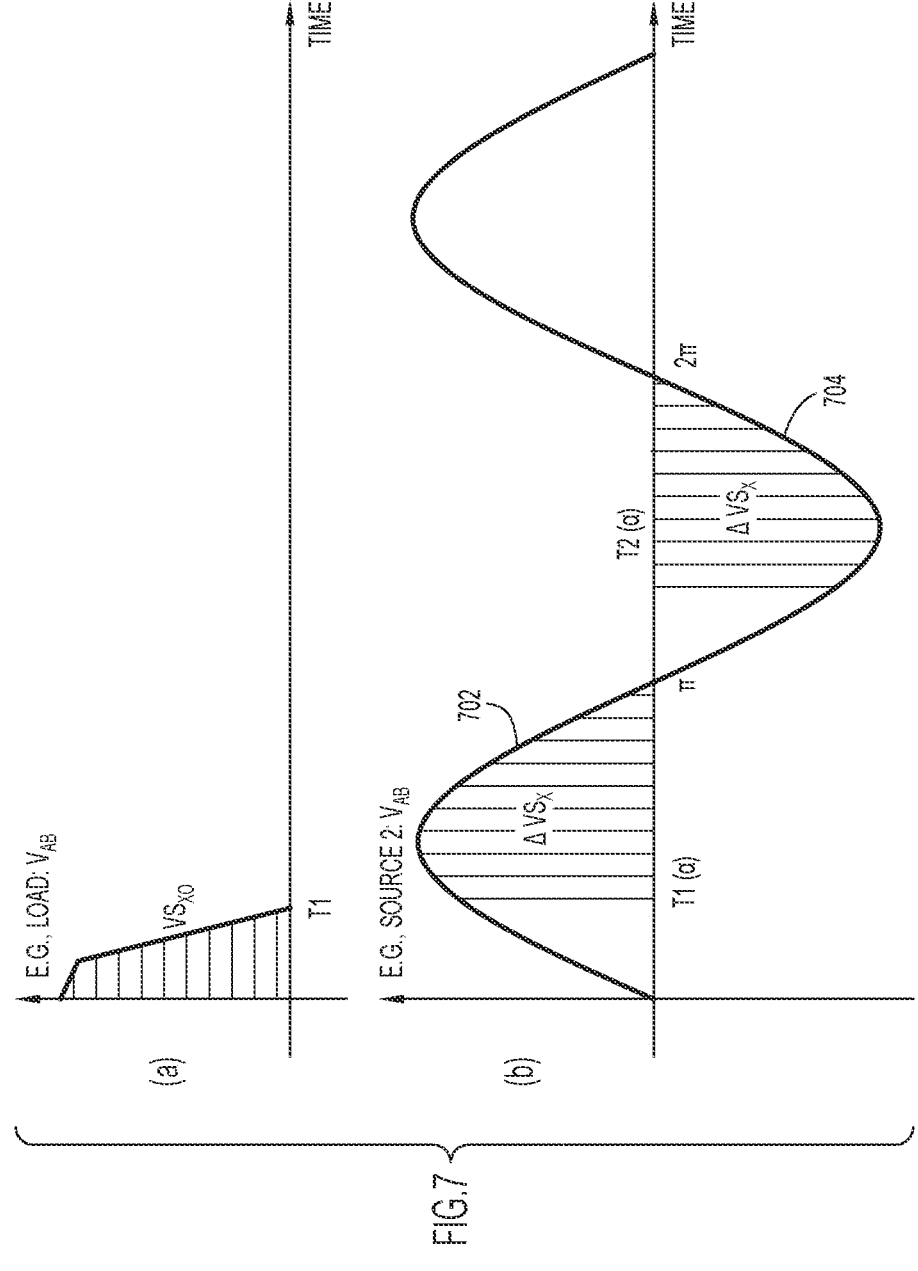
FIG. 7 shows example waveforms for the MTV control related to the event timeline of FIG. 6.

FIG. 7 shows example waveforms (a) and (b) for the MTV control related to voltage $VS_X$ shortly before and after time T1 of FIG. 6, where S is 2 in the example, and X may be AB, BC, or CA for voltages VS1. Waveform (a) shows initial volt-second $VS_{X0}$ for voltage $VS_X$ at time T1. Waveform (b) shows, at 702, sub/half-cycle integration of voltage $VS_X$ beginning with phase angle $\alpha$ over a first half-cycle when a is in the first half-cycle at time T1, to produce volt-second change $\Delta VS_{X0}$. Waveform (b) also shows, at 704, sub/half-integration of voltage $VS_X$ beginning with phase angle $\alpha$ over a second half-cycle when a is in the second half-cycle at time T1, to produce volt-second change $\Delta VS_{X0}$.

FIG. 8 shows an example of controlling SCRs 802 of power switch 106 to apply to transformer and load 108 any of voltages $V_{AB}$, $V_{BC}$, and $V_{CA}$ (which generally represent the sensed voltages of VS1 or VS2) using binary codes or vectors 806. SCRs 802 include SCRs (A+, A−), (B+, B−), and (C+, C−), which may correspond to SCRs (S1, S2), (S3, S4), (S5, S6) of FIG. 2, for example. In the example of FIG. 8, the binary numbers of each row of vectors 806 indicate ON/OFF states of SCRs 802, where "1" means ON, and "0" means OFF. The rows of vectors corresponding to turning ON selected voltages. For example, to apply voltage $V_{AB}$ in zone 4, first row vector "100100" is used, which means turn ON SCRs A+ and B−, and turn OFF all other SCRs. Similarly, other vectors are used for other voltages in different zones. The MTV control can apply 0, 1, 2, or 3 voltages to the transformer and load 108 during the transient period before VSB is reapplied.

FIGS. 9-14 show example (sensed) voltage and current waveforms of power system 100 for the MTV control during the VSB wait time. In FIGS. 9-14, voltages $V_{ABi}$, $V_{BCi}$, and $V_{CAi}$ (where i=1 or 2) may be given generic reference labels $V_{AB}$, $V_{BC}$, and $V_{CA}$.

Figure 9:
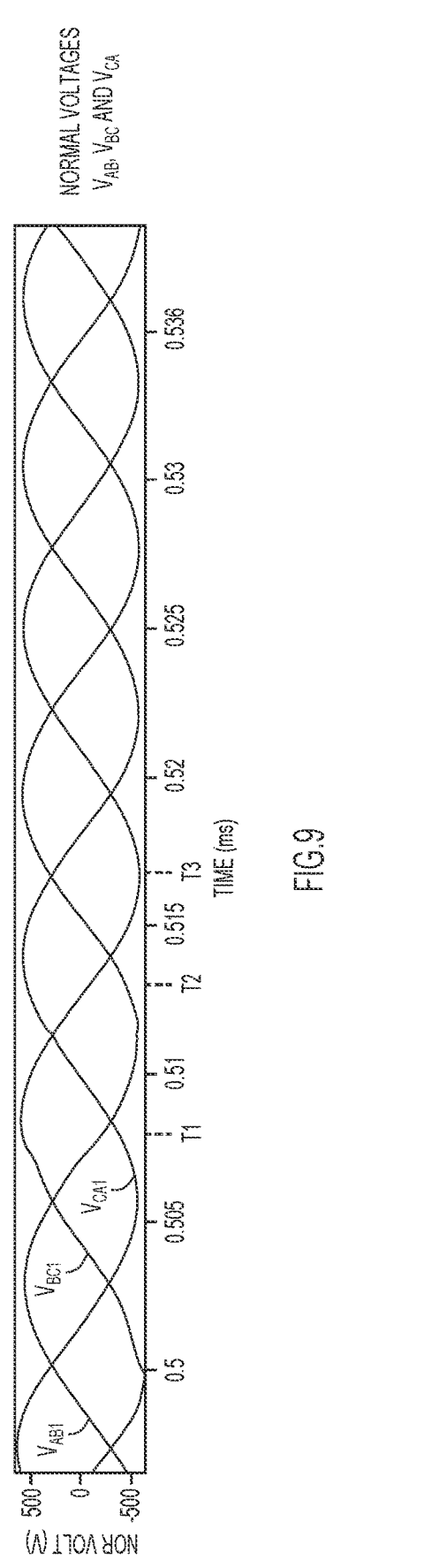
FIG. 9 shows example normal voltage waveforms generated by a normal power source and employed during the VSB transfer with MTV control.

FIG. 9 shows example waveforms for voltages VS1 (also referred to as "normal voltages"), including voltages $V_{AB1}$, $V_{BC1}$, and $V_{CA1}$.

Figure 10:
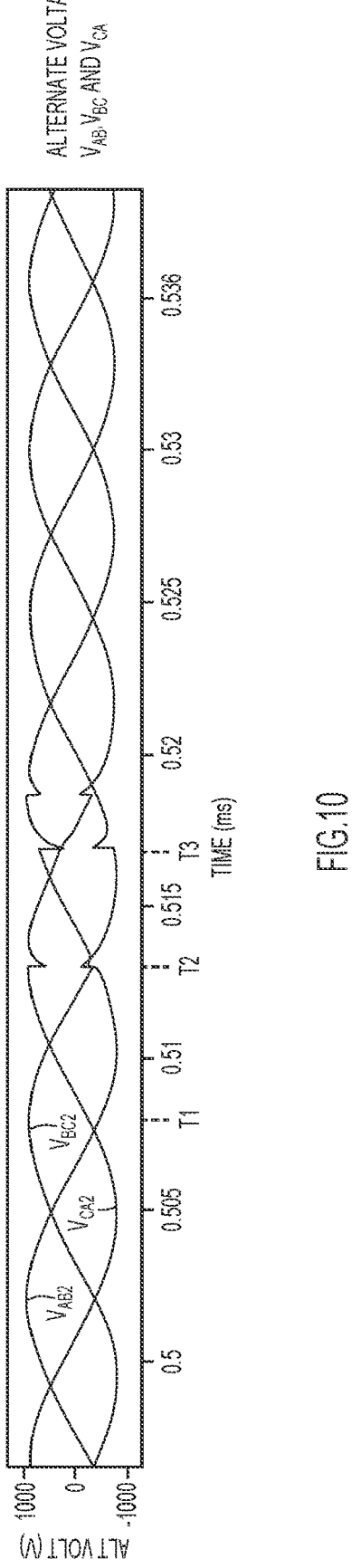
FIG. 10 shows example alternate voltage waveforms generated by an alternate power source and employed during the VSB transfer with MTV control.

FIG. 10 shows example waveforms for voltages VS2 (also referred to as "alternate" voltages), including voltages $V_{AB2}$, $V_{BC2}$, and $V_{CA2}$.

Figures 11, 12:
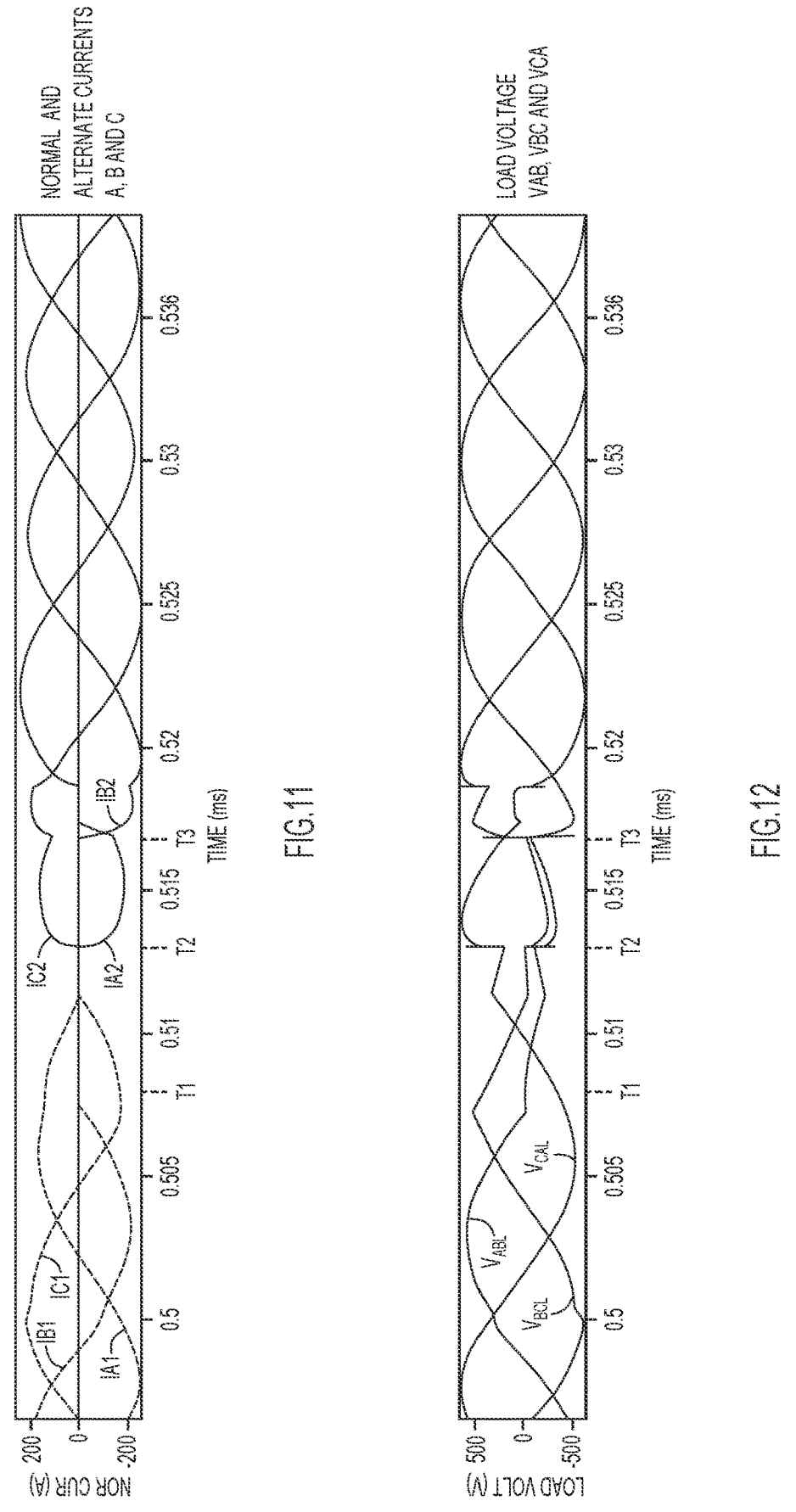
FIG. 11 shows example normal and alternate current waveforms employed during the VSB transfer with MTV control.
FIG. 12 shows example load voltage waveforms employed during the VSB transfer with MTV control

FIG. 11 shows example waveforms for initial currents IA1, IB1, and IC1 (shown in dashed line) associated with initial voltages VA1, VB1, and VC1, and currents IA2, IB2, and IC2 (shown in solid line) associated with voltages VA2, VB2, and VC2. FIG. 11 also shows times T1, T2, and T3 of event timeline 600 from FIG. 6, which coincide with detecting the power failure, applying qualified voltage(s), and detecting volt-second balance, which ends the VSB wait time. All currents IA1, IB1, and IC1 drop to zero during the VSB wait time between times T1 and T2.

FIG. 12 shows example waveforms for load voltages $V_{ABL}$, $V_{BCL}$, $V_{ACL}$. FIG. 12 also shows times T1, T2, and T3 of event timeline 600 from FIG. 6. After time T1, the load voltages tend toward zero. At time T2, the MTV control applies alternate voltage $V_{CA2}$ to the load, which energizes load voltage $V_{CAL}$. At time T3, the remaining alternate voltages are switched to the load, energizing all of the load voltages. As shown, the MTV control applies voltage $V_{CA}$ to the load at 513 ms, instead of waiting until the volt-second balance to be achieved at 516 ms. This advantageously increases the transient RMS voltage at the load. The MTV control effectively reduces a voltage interruption time by 6 ms.

Figure 13:
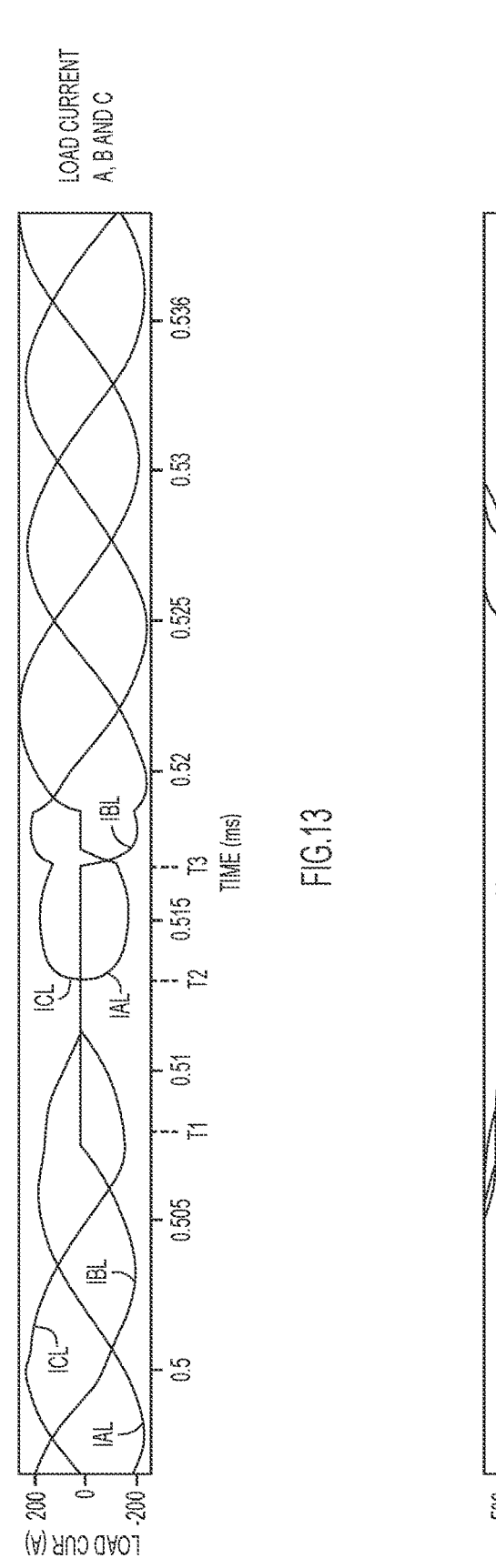
FIG. 13 shows example load current waveforms employed during the VSB transfer with MTV control.

FIG. 13 shows example waveforms for load currents IAL, IBL, and ICL feeding respective transformer-load sections 220A, 220B, and 220C. The load currents (i) drop to zero shortly after time T1 due to the power failure and turn OFF of all SCRs, (ii) increase at time T2 due to the MTV control, and (iii) normalize at time T3.

Figure 14:
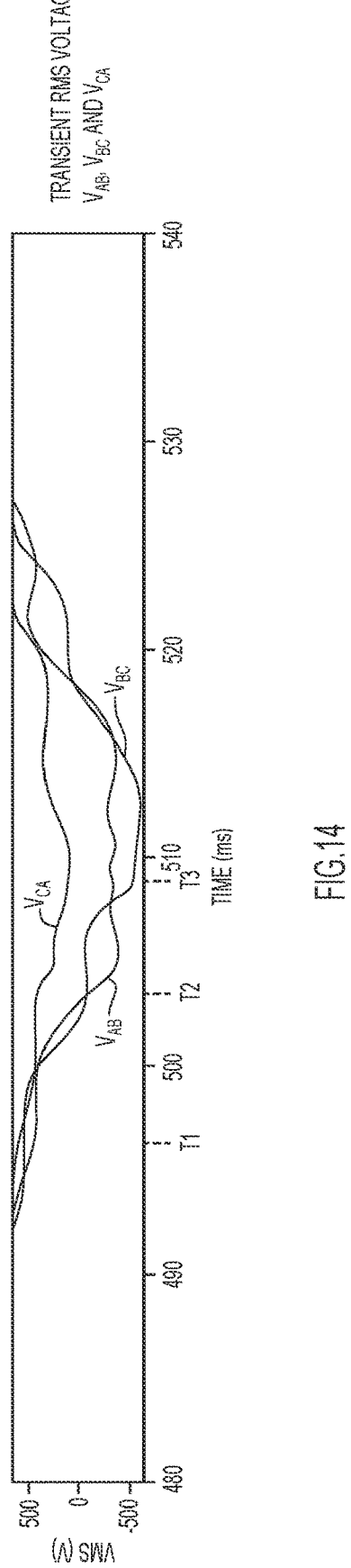
FIG. 14 shows transient root-mean-square (RMS) voltages for the voltages employed during the VSB transfer with MTV control.

FIG. 14 shows transient RMS voltages for voltages $V_{AB}$, $V_{BC}$, and $V_{CA}$.

FIG. 15 is a flowchart of another example method 1500 of performing a VSB transfer with MTV control. Method 1500 may be performed by power system 100.

1502 includes: generating voltages (which may also be referred to as "first voltages" or "normal voltages") and alternate voltages (which may also be referred to as "second voltages") capable of powering a load as load voltages through a switch. The voltages may include AC voltages and the alternate voltages may include alternate AC voltages.

At 1502, initially applying the voltages to the load as the load voltages, and perform a black start.

At 1504, upon detecting a power fault that necessitates applying the alternate voltages to the load in place of the voltages, disconnecting the voltages from the load.

At 1506, while waiting to detect a volt-second balance between the alternate voltages and the load voltages, executing MTV control. The MTV control includes determining one or more qualified voltages of the alternate voltages that will not saturate the load, and applying the one or more qualified voltages to the load as the load voltages, but not applying any of the alternate voltages that are not the one or more qualified voltages.

At 1508, upon detecting the volt-second balance, additionally applying to the load each alternate voltage that is not the one or more qualified voltages.

At 1510, after additionally applying, second volt-second balancing the alternate voltages with the load voltages.

Figure 16:
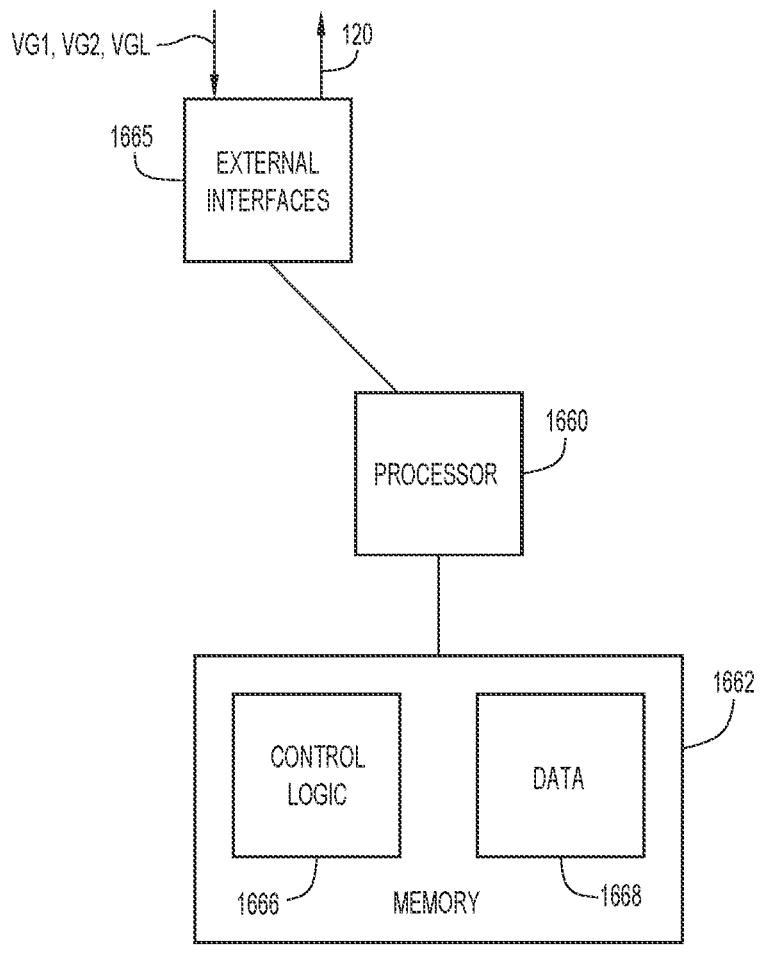
FIG. 16 is a block diagram of a controller of the power system according to an embodiment.

FIG. 16 is a block diagram of controller 116 according to an embodiment. Controller 116 includes processor(s) 1660 (which may be a processor), a memory 1662, and external interfaces 1665 communicatively coupled to one another. External interfaces 1665 receive sensed currents, sensed voltages VG1, VG2, and VGL, and provide switch control signal 120. Each of the aforementioned components may be implemented in hardware, software, or a combination thereof. Memory 1662 stores control software 1666 (referred as "control logic"), that when executed by the processor(s) 1660, causes the processor(s), and more generally, controller 116, to perform the various operations described herein. The processor(s) 1660 may be a microprocessor or microcontroller (or multiple instances of such components). The memory 1662 may include read only memory (ROM), random access memory (RAM), magnetic disk storage media devices, optical storage media devices, flash memory devices, electrical, optical, or other physically tangible (i.e., non-transitory) memory storage devices. Controller 116 may also be discrete logic embedded within an integrated circuit (IC) device.

Thus, in general, the memory 1662 may comprise one or more tangible (non-transitory) computer readable storage media (which may be a non-transitory computer readable medium) (e.g., memory device(s)) encoded with software or firmware that comprises computer executable instructions. For example, control software 1666 includes logic to implement operations performed by the controller 116. Thus, control software 1666 implements the various methods/operations described herein.

In addition, memory 1662 stores data 1668 used and produced by control software 1666.

In some aspects, the techniques described herein relate to a method performed by a power system and including: applying normal voltages to a load as load voltages; upon detecting a power fault that necessitates applying alternate voltages to the load in place of the normal voltages, disconnecting the normal voltages from the load; while waiting to detect a volt-second balance between the alternate voltages and the load voltages, determining one or more qualified voltages of the alternate voltages that will not saturate the load, and applying the one or more qualified voltages to the load as the load voltages; upon detecting the volt-second balance, additionally applying to the load each alternate voltage that is not the one or more qualified voltages; and after additionally applying, volt-second balancing the alternate voltages with the load voltages.

In some aspects, the techniques described herein relate to a method, wherein: determining includes determining the one or more qualified voltages based on volt-second changes of the alternate voltages that occur between detecting the power fault and detecting the volt-second balance.

In some aspects, the techniques described herein relate to a method, wherein determining includes, for each alternate voltage: computing a volt-second when the power fault is detected; computing a volt-second change after the power fault is detected; summing the volt-second to the volt-second change to produce a total volt-second; and comparing the total volt-second to a threshold.

In some aspects, the techniques described herein relate to a method, wherein determining further includes, for each alternate voltage: when the total volt-second is less than the threshold, declaring each alternate voltage a qualified voltage; and when the total volt-second is not less than the threshold, not declaring each alternate voltages the qualified voltage.

In some aspects, the techniques described herein relate to a method, wherein determining further includes, for each alternate voltage: detecting a phase angle when the power fault is detected, wherein computing the volt-second change includes computing the volt-second change over only a half-cycle starting with the phase angle.

In some aspects, the techniques described herein relate to a method, wherein computing the volt-second change further includes: computing the volt-second change over a first half-cycle when the phase angle is less than 180 degrees; and computing the volt-second change over a second half-cycle when the phase angle is not less than 180 degrees.

In some aspects, the techniques described herein relate to a method, further including, while waiting to detect: computing alternate volt-seconds of the alternate voltages; computing load volt-seconds of the load voltages; and comparing the alternate volt-seconds against the load volt-seconds.

In some aspects, the techniques described herein relate to a method, wherein the normal voltages include a first voltage, a second voltage, and a third voltage, and the method further includes: integrating the first voltage to produce a first volt-second and integrating the second voltage to produce a second volt-second; deriving a third volt-second for the third voltage based on the first volt-second and the second volt-second, without integrating the third voltage; and volt-second balancing the first volt-second, the second volt-second, and the third volt-second against corresponding volt-seconds of the load voltages.

In some aspects, the techniques described herein relate to a method, wherein: the normal voltages include first line-to-line three-phase alternating current voltages; and the alternate voltages include second line-to-line three-phase alternating current voltages.

In some aspects, the techniques described herein relate to a method, including: generating the normal voltages using a normal power source; and generating the alternate voltages using an alternate power source.

In some aspects, the techniques described herein relate to a power system including a controller to control a switch to apply normal voltages or alternate voltages to a load as load voltages to power the load, the controller configured to perform: causing the switch to apply the normal voltages to the load as the load voltages; first volt-second balance the normal voltages against the load voltages; upon detecting a power fault that necessitates applying the alternate voltages to the load in place of the normal voltages, causing the switch to disconnect the normal voltages from the load; while waiting to detect a volt-second balance between the alternate voltages and the load voltages, determining one or more qualified voltages among the alternate voltages that will not saturate the load, and causing the switch to apply the one or more qualified voltages to the load; upon detecting the volt-second balance, causing the switch to also apply to the load each alternate voltage that is not the one or more qualified voltages; and after causing the switch to also apply to the load each alternate voltage that is not a qualified voltage, second volt-second balance the alternate voltages with the load voltages.

In some aspects, the techniques described herein relate to a power system, wherein: determining includes determining the one or more qualified voltages based on volt-second changes of the alternate voltages that occur between detecting the power fault and detecting the volt-second balance.

In some aspects, the techniques described herein relate to a power system, wherein the controller is configured to perform determining by, for each alternate voltage: computing a volt-second when the power fault is detected; computing a volt-second change after the power fault is detected; summing the volt-second to the volt-second change to produce a total volt-second; and comparing the total volt-second to a threshold.

In some aspects, the techniques described herein relate to a power system, wherein the controller is further configured to perform determining by, for each alternate voltage: when the total volt-second is less than the threshold, declaring the qualified voltage; and when the total volt-second is not less than the threshold, not declaring the qualified voltage.

In some aspects, the techniques described herein relate to a power system, wherein the controller is further configured to perform determining by, for each alternate voltage: detecting a phase angle when the power fault is detected, wherein computing the volt-second change includes computing the volt-second change over only a half-cycle starting with the phase angle.

In some aspects, the techniques described herein relate to a power system, wherein the controller is configured to perform computing the volt-second change by: computing the volt-second change over a first half-cycle when the phase angle is less than 180 degrees; and computing the volt-second change over a second half-cycle when the phase angle is not less than 180 degrees.

In some aspects, the techniques described herein relate to a power system, wherein the controller is further configured to perform, while waiting to detect: computing alternate volt-seconds of the alternate voltages; computing load volt-seconds of the load voltages; and comparing the alternate volt-seconds against the load volt-seconds.

In some aspects, the techniques described herein relate to a power system, wherein the normal voltages include a first voltage, a second voltage, and a third voltage, and wherein the controller is further configured to perform: integrating the first voltage to produce a first volt-second and integrating the second voltage to produce a second volt-second; deriving a third volt-second for the third voltage based on the first volt-second and the second volt-second, without integrating the third voltage; and volt-second balancing the first volt-second, the second volt-second, and the third volt-second against corresponding volt-seconds of the load voltages.

In some aspects, the techniques described herein relate to a power system, wherein: the normal voltages include first line-to-line three-phase alternating current voltages; and the alternate voltages include second line-to-line three-phase alternating current voltages.

In some aspects, the techniques described herein relate to a power system, wherein the controller is further configured to perform: receiving sensed normal voltages indicative of the normal voltages; and receiving sensed alternate voltages indicative of the alternate voltages.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method performed by a power system and comprising:

applying normal voltages to a load as load voltages;

upon detecting a power fault that necessitates applying alternate voltages to the load in place of the normal voltages, disconnecting the normal voltages from the load;

while waiting to detect a volt-second balance between the alternate voltages and the load voltages, determining one or more qualified voltages of the alternate voltages that will not saturate the load, applying the one or more qualified voltages to the load as the load voltages, computing alternate volt-seconds of the alternate voltages and load volt-seconds of the load voltages, and comparing the alternate volt-seconds against the load volt-seconds;

upon detecting the volt-second balance, additionally applying to the load each alternate voltage that is not the one or more qualified voltages; and after additionally applying, volt-second balancing the alternate voltages with the load voltages.

2. The method of claim 1, wherein:

determining includes determining the one or more qualified voltages based on volt-second changes of the alternate voltages that occur between detecting the power fault and detecting the volt-second balance.

3. The method of claim 2, wherein determining includes, for each alternate voltage:

computing a volt-second when the power fault is detected;

computing a volt-second change after the power fault is detected;

summing the volt-second to the volt-second change to produce a total volt-second; and comparing the total volt-second to a threshold.

4. The method of claim 3, wherein determining further includes, for each alternate voltage:

when the total volt-second is less than the threshold, declaring each alternate voltage a qualified voltage; and when the total volt-second is not less than the threshold, not declaring each alternate voltages the qualified voltage.

5. The method of claim 3, wherein determining further includes, for each alternate voltage:

detecting a phase angle when the power fault is detected, wherein computing the volt-second change includes computing the volt-second change over only a half-cycle starting with the phase angle.

6. The method of claim 5, wherein computing the volt-second change further includes:

computing the volt-second change over a first half-cycle when the phase angle is less than 180 degrees; and computing the volt-second change over a second half-cycle when the phase angle is not less than 180 degrees.

7. The method of claim 1, wherein the normal voltages include a first voltage, a second voltage, and a third voltage, and the method further comprises:

integrating the first voltage to produce a first volt-second and integrating the second voltage to produce a second volt-second;

deriving a third volt-second for the third voltage based on the first volt-second and the second volt-second, without integrating the third voltage; and volt-second balancing the first volt-second, the second volt-second, and the third volt-second against corresponding volt-seconds of the load voltages.

8. The method of claim 1, wherein:

the normal voltages include first line-to-line three-phase alternating current voltages; and the alternate voltages include second line-to-line three-phase alternating current voltages.

9. The method of claim 1, comprising:

generating the normal voltages using a normal power source; and generating the alternate voltages using an alternate power source.

10. A power system comprising a controller to control a switch to apply normal voltages or alternate voltages to a load as load voltages to power the load, the controller configured to perform:

causing the switch to apply the normal voltages to the load as the load voltages;

first volt-second balance the normal voltages against the load voltages;

upon detecting a power fault that necessitates applying the alternate voltages to the load in place of the normal voltages, causing the switch to disconnect the normal voltages from the load;

while waiting to detect a volt-second balance between the alternate voltages and the load voltages, determining one or more qualified voltages among the alternate voltages that will not saturate the load, applying the one or more qualified voltages to the load as the load voltages, computing alternate volt-seconds of the alternate voltages and load volt-seconds of the load voltages, and comparing the alternate volt-seconds against the load volt-seconds;

upon detecting the volt-second balance, causing the switch to also apply to the load each alternate voltage that is not the one or more qualified voltages; and after causing the switch to also apply to the load each alternate voltage that is not a qualified voltage, second volt-second balance the alternate voltages with the load voltages.

11. The power system of claim 10, wherein:

determining includes determining the one or more qualified voltages based on volt-second changes of the alternate voltages that occur between detecting the power fault and detecting the volt-second balance.

12. The power system of claim 11, wherein the controller is configured to perform determining by, for each alternate voltage:

computing a volt-second when the power fault is detected;

computing a volt-second change after the power fault is detected;

summing the volt-second to the volt-second change to produce a total volt-second; and comparing the total volt-second to a threshold.

13. The power system of claim 12, wherein the controller is further configured to perform determining by, for each alternate voltage:

when the total volt-second is less than the threshold, declaring the qualified voltage; and when the total volt-second is not less than the threshold, not declaring the qualified voltage.

14. The power system of claim 12, wherein the controller is further configured to perform determining by, for each alternate voltage:

detecting a phase angle when the power fault is detected, wherein computing the volt-second change includes computing the volt-second change over only a half-cycle starting with the phase angle.

15. The power system of claim 14, wherein the controller is configured to perform computing the volt-second change by:

computing the volt-second change over a first half-cycle when the phase angle is less than 180 degrees; and computing the volt-second change over a second half-cycle when the phase angle is not less than 180 degrees.

16. The power system of claim 10, wherein the normal voltages include a first voltage, a second voltage, and a third voltage, and wherein the controller is further configured to perform:

integrating the first voltage to produce a first volt-second and integrating the second voltage to produce a second volt-second;

deriving a third volt-second for the third voltage based on the first volt-second and the second volt-second, without integrating the third voltage; and volt-second balancing the first volt-second, the second volt-second, and the third volt-second against corresponding volt-seconds of the load voltages.

17. The power system of claim 10, wherein:

the normal voltages include first line-to-line three-phase alternating current voltages; and the alternate voltages include second line-to-line three-phase alternating current voltages.

18. The power system of claim 10, wherein the controller is further configured to perform:

receiving sensed normal voltages indicative of the normal voltages; and receiving sensed alternate voltages indicative of the alternate voltages.

* * * * *